Patented Oct. 26, 1937

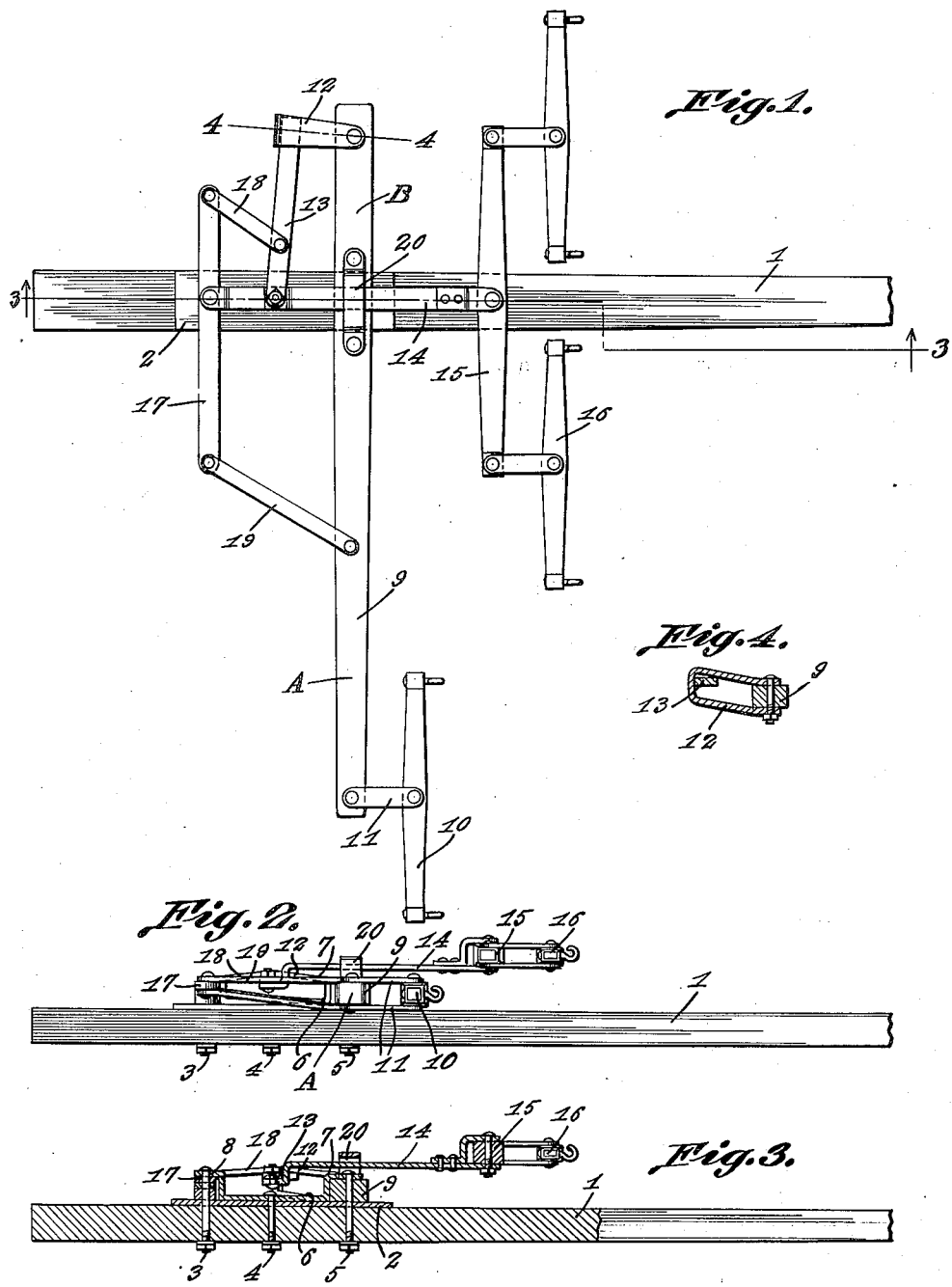

2,097,396

UNITED STATES PATENT OFFICE 2,097,396

DRAFT EQUALIZER

Claude C. Harris, Murfreesboro, Tenn.

Application July 27, 1937, Serial No. 155,991

2 Claims. (Cl. 278—16)

This invention relates to a draft equalizer and has for the primary object the provision of a device of this character which is especially adapted for hitching three draft animals abreast to a wagon or other implement which includes a draft tongue with a pair of said animals working abreast at one side of the tongue and the other animal working at the opposite side of the tongue from the pair of animals and abreast of said pair of animals, the device being of such a construction that the three animals pull equally from a common point of draft.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating a draft equalizer constructed in accordance with my invention and showing the same mounted on a draft tongue.

Figure 2 is a side elevation illustrating the same.

Figure 3 is a sectional view taken on the line 3—3 of Figure 1.

Figure 4 is a sectional view taken on the line 4—4 of Figure 1.

Referring in detail to the drawing, the numeral 1 indicates a draft tongue on which is secured a wear plate 2 by bolts 3, 4 and 5. Mounted on the wear plate is an upper plate 6 being secured to the wear plate 2 by the bolt 4 and has offset ends 7 and 8. The bolt 5 extends through the offset end 7 and the bolt 3 extends through the offset end 8. An equalizer lever 9 is pivoted on the tongue 1 by the bolt 5 extending therethrough. The equalizer lever 9 works between the offset end 7 of the upper plate 6 and the wear plate 2. The equalizer lever 9 includes a long end A and a short end B. A single tree 10 is connected to the long end A of the equalizer lever 9 by a link 11. A single draft animal is hitched to the single tree 10 positioning said animal a considerable distance from the draft tongue.

A clip 12 is pivoted on the short end B of the lever 9 and receives therein a comparatively short lever 13 to which is pivoted a double tree connecting plate 14. The connecting plate extends forwardly of the lever 9 and in a plane above the same and parallels the draft tongue and has pivoted to its forward end a double tree 15 to which are connected single trees 16, one of which is positioned on the same side of the draft tongue with the single tree 10 but slightly forward thereof while the other single tree 16 is positioned on the opposite side of the draft tongue from the single tree 10. A lever 17 is pivotally mounted on the draft tongue rearwardly of the levers 13 and 9 by the bolt 3. One end of the lever 17 is connected to the lever 13 by a link 18. The link 18 connects with the lever 13 closer to its point of connection with the double tree connecting plate than with the end which is received in the clip 12. The other end of the lever 17 has pivoted thereto a link 19 which is in turn pivoted to the lever 9 slightly laterally of the last-named end of the lever 17. A pair of animals is hitched to the single trees 16 and a third animal is hitched to the single tree 10. The third animal due to the arrangement of the levers 9, 17 and 13 and the links 18 and 19 will pull an equal amount to either of the animals hitched to the single trees 16.

A guard strap 20 overlies the double tree connecting plate 14 and is secured at opposite ends on the lever 9 whereby the connecting plate 14 is free to swing a limited distance in either direction.

What is claimed is:

1. A draft equalizer comprising a lever pivotally mounted on a draft tongue to have a short end and a long end, a single tree connected with the long end of said lever, a second lever loosely connected with the short end of the first-named lever and terminating over the draft tongue, a connecting plate pivoted on said second-named lever and paralleling the draft tongue, a double tree pivoted on said connecting plate, single trees connected with said double tree, and means pivotally mounted on the draft tongue and connected to the second and first-named levers.

2. A draft equalizer comprising a lever pivotally mounted on a draft tongue to have a short end and a long end, a single tree connected with the long end of said lever, a second lever loosely connected with the short end of the first-named lever and terminating over the draft tongue, a connecting plate pivoted on said second named lever and paralleling the draft tongue, a double tree pivoted on said connecting plate, single trees connected with said double tree, a third lever pivoted on the draft tongue, a link pivotally connected to the second lever and to one end of the third lever, a link pivoted on the other end of the third lever and onto the first lever between its pivot and the connection of the first-named single tree thereto.

CLAUDE C. HARRIS.